3,584,073
ABLATIVE COMPOSITION CONTAINING A POLY-EPOXIDE AND p-POLYPHENYLENE
David N. Vincent, Woodland Hills, and Charles L. Hamermesh, Tarzana, Calif., assignors to North American Rockwell Corporation
No Drawing. Filed Sept. 1, 1966, Ser. No. 576,552
Int. Cl. C08g 43/02, 45/06
U.S. Cl. 260—830
4 Claims

ABSTRACT OF THE DISCLOSURE

An ablative composition comprising a castable polyglycidyl ether of a polyhydric phenol and p-polyphenylene in an amount sufficient to provide a charring surface.

---

This invention relates to new compositions of matter for use at high temperature applications.

More particularly, the invention relates to the novel polymer compositions which serve as ablative materials.

Ablative compositions are used in current technology or where high temperatures are encountered. Particular applications for ablative materials reside in the aerospace technology such as nose cones, rocket motor thrust chambers and nozzle areas but to mention a few. Ablative compositions are generally comprised of polymeric materials, usually reinforced with various fillers. Ablation of the selected material can occur by means of two major processes. Firstly, the polymer can form a carbonaceous char. The char so formed upon exposure of the polymer to the hot environment serves both as a structural material and as an insulator. The second major vehicle for ablative heat protection is the transpiration of the polymer from a solid to a gaseous state. In other words, the polymer undergoes cracking to form lower hydrocarbon gases due to the elevated temperatures. In undergoing the cracking operation, the polymer used as the ablator absorbs a considerable amount of heat and thus serves to protect underlying surfaces.

One of the best known ablative compositions in present utilization is phenolic resins, such as phenol-formaldehyde, filled with glass fibers. On heating, this material forms both a char and undergoes to a degree a cracking whereby the phenolic resin breaks down to gases. The glass fibers serve as reinforcement of the char formed from the phenolic. In applications where the gases contain halogens which can attack the glass fibers and form silicon halides, other materials must be utilized as the reinforcing element. Other ablative systems utilize polymers that will form chars as well as crack and have as a filler material asbestos or other inorganics which are known heat insulators. All of the prior systems, though often satisfactory for their ablative ability, encounter problems with regard to increasing the weight of the item with which they are associated. In various rockets, for example, weight is of utmost importance and thus means are always sought to lower the density of various components, such as the ablative materials. Additionally, the prior ablative compositions are costly and complex in construction. In the glass fiber reinforced systems, much hand operation is involved in forming the ablative part. This is necessitated by laying the glass cloth used as reinforcement in peculiar desired patterns to effect maximum thermal resistance and char strength. Additionally, the previous composition required machining operations to obtain the desired contours. Further, it is difficult to attach metal hardware to the prior ablative compositions.

Thus, an object of this invention is to provide a filled ablative resinous system having low density.

A further object of the invention is to provide a novel ablative composition which is castable and possesses properties superior to previously castable compositions.

The above and other objects of the invention are accomplished by a novel ablative composition comprised of a liquid castable resin filled with para-polyphenylene polymer. Throughout this discussion epoxy resins will be used as a typical example of resins which are normally liquid materials and thus can be readily cast into desired shapes. They are known as gas forming ablators and have been used as such. However, they produce essentially no char layer. Previously they have in some instances, been filled with inorganic fillers. However, as will be shown, the utilization of para-polyphenylene which is an intractable polymer, normally existing in a powder form, serves to produce a char layer giving insulative ability, greater structural strength, and serving as a catalytic bed for the cracking of the original degradation products of the epoxy resin matrix material to lower molecular weight gaseous products, thus providing a more efficient cooling effect. It is believed that the invention will be better understood from the following detailed description and the specific examples.

The filler material used in the novel ablative composition of the invention is indicated as para-polyphenylene which is prepared by the polymerization of benzene and is described in the literature by Kovacic and Kyriakas, Journal of the American Chemical Society, vol. 85, page 454 (1963). Briefly this method entails the reaction of benzene with a Lewis acid and oxidant, such as $AlCl_3$ and $CuCl_2$. $FeCl_3$ or $MoCl_5$ can be used to serve both functions. The reaction temperature ranges from ambient to reflux. The resulting product is washed clean of inorganic residues and dried, producing a light tan to dark brown insoluble and infusible powder.

Para-polyphenylene will form a char upon contact with the hot environment. As indicated in co-pending application, Ser. No. 492,315, filed Oct. 1, 1965, unexpectedly it has been found that compacted polyphenylene, for example, will form a graphitic-like structure upon pyrolyzation at relatively low temperature.s In the present compositions contemplated, the para-polyphenylene not being compacted, will form a char material which will serve as previously indicated to strengthen the ablative composition and serve to catalyze the cracking of the epoxy matrix. Para-polyphenylene is particularly valuable in that it has the highest thermal stability of any known polymeric material and thus will undergo only a small loss in weight at the high temperatures as compared to other char forming materials which will not be completely converted to char but rather undergo considerable degradation. Additionally, as compared to various inorganic fillers, the para-polyphenylene has a much lower density. Thus a resultant composition incorporating the material will be light in weight. Additionally, as compared to inorganic filled systems which inherently possess noncombustible residues, the entire ablative composition is combustible and thus, it has been found, that the degradation products will contribute as a fuel to a rocket motor system in which it is utilized serving to increase performance. To explain this contribution it is noted carbon will burn as in the case of coal. Thus, the char formed will eventually burn. Silica or asbestos and other inorganic fillers will not burn. In an oxidizer rich system, such as in a liquid rocket engine, additional fuel will shift the system closer to stoichiometry and increase performance. Silica or asbestos particles that enter into exhaust stream will, on the other hand, reduce efficiency.

Generally from 5 to 50 parts per hundred parts of resin (phr.) of the para-polyphenylene can be incorporated into the epoxy resin matrix as a filler material.

Generally, it is desirable to use as much p-polyphenylene as can be added to the epoxy resin yet not affecting the castability or flow properties of the resin. Thus, the upper limit of p-polyphenylene that can be used is dictated by the resin matrix and the desire to maintain the important advantage of castability.

The epoxy resins are well known and are usually derived from Bisphenol A and epichlorohydrin. An example of these are the well known Epon resins manufactured by the Shell Chemical Company. Various curing agents are utilized with the epoxy resins to effect the cure of the normally liquid material into a solid mass. For the Epon type resins a series of curing agents known as Epon Curing Agents are available. Another example of the epoxy type resin that can be successfully utilized is epoxy-novolak resins such as Epocast made by Furane Plastics, Inc. The novolaks are phenol-formaldehyde resins. The instant material results from the reaction of the novolaks to introduce epoxy groups on the polymer chain. Once again suitable curing agents are utilized to effect a solid usable mass from the material. The amounts of curing agent are within the skill of the art and are determined by the quantity of epoxy resin used. Generally the curing agents, which can be used for both the epoxy and epoxy-novolak resins are of the di or polyfunctional amine, acid, or anhydride type. The manufacturer of the epoxy resin normally furnishes the curing agent for his particular resin. Additionally, the amount of curing agent, time, temperature, and pressure of curing are also furnished by the resin manufacturer. It should be apparent the epoxy resin system is well known in the art and information pertaining to the resins and cure agents are widely available. The herein invention is directed to the incorporation of a specific compound, p-polyphenylene, into the resin system. In preparing the ablative compositions, the para-polyphenylene, epoxy resin and curing agent are thoroughly mixed in the desired weight proportions. The mixture is then poured into a mold of the desired configurations and heated to the cure temperature during which a solid matrix of the epoxy resin material is formed having dispersed therein the particle of the para-polyphenylene polymer.

Following are detailed examples disclosing the properties of the ablative compositions of this invention:

EXAMPLE I

A plurality of sample discs have dimensions of 1" diameter by ⅛" were prepared. The compositions varied from 100 percent epoxy-novolak resin and 100 percent Epon resin to composites of these materials containing as a filler para-polyphenylene. The compositions based on 100 parts of resin are given in Table 1. In Table I, immediately below, the chemical composition of the "Components" is as follows: Epocast® Hardener 9216-1 is a commercially available product of Furane Plastics, Inc., and it is a blend of an aliphatic amine and a modified aromatic amine. The aliphatic amine is diethylene triamine. The modified aromatic amine is prepared by the reaction of a 10:1 mixture of diaminodiphenyl sulfone and the diglycidyl ether of Bisphenol A with tris(dimethylaminomethyl) phenol. This reaction liberates dimethyl amine and produces a liquid primary tertiary amine containing a phenolic hydroxyl group and is carried out in accordance with the teaching of U.S. Pat. 2,837,497.

Epon® Curing Agent T is a commercially available product of the Shell Chemical Company and it is the reaction product of diethylene triamine with a less than equivalent quantity of ethylene oxide. It is a pale yellow liquid having a viscosity of 15 to 22 poises at 77° F.

Epocast® 31 A (Epoxy-novolak) is a commercially available product of Furane Plastics, Inc., and it is an epoxy-novolak resin blended with reactive diluents so as to give an epoxide equivalent of 120–150 grams per mole of epoxde group and a low viscosity. The resin is the reaction product of linear phenol-formaldehyde condensation product (a novolak) with epichlorohydrin. The reactive diluent is a mixture of phenyl glycidyl ether and bis-(2,3-epoxycyclopentyl) ether. Epocast 31 A has a viscosity at 75° F. as measured with a Brookfield Viscosimeter of 1500 to 2500, a Shore D hardness of 92–94, a modulus of elasticity in flexure (pounds per square inch) of $2.2 \times 10^6$, coefficient of thermal expansion in./in./° C. of $2.0$–$2.2 \times 10^{-5}$, and a Barcol hardness of 60.

Epon® 820 (Epoxy) is a commercially available product of the Shell Chemical Company, and it is a liquid diglycidyl ether of bis-phenol having a viscosity in centipoise at 25° C. of 10,000 to 16,000 and epoxy equivalent weight of 188 to 192 and, when diluted with 2 to 5 percent of phenyl glycidyl ether, the viscosity is lowered to 4,000 to 10,000 centipoise and the epoxy equivalent weight to 180 to 195.

The sample discs were exposed in a solar furnace. High speed motion pictures were taken during the exposure to indicate the behavior of the test samples under conditions of high heat fluxes. The results of the motion pictures indicated that the unfilled epoxy and epoxy-novolak resin vaporized with the formation of very little char. The presence of the p-polyphenylene as a filler resulted in the formation of a dense, tightly adhering char layer. The material under the adhering char layer appeared to be unchanged. As a result, the test clearly indicated that the filled epoxy resins combined the properties of a gas forming and char forming ablators. In general, the p-polyphenylene sample, No. 7, exhibited less surface regression than did the composite samples Nos. 3, 6, 2 and 5 which, in turn, exhibited less than the unfilled binder resins Nos. 4 and 1.

EXAMPLE II

A rocket motor thrust liner was fabricated. The liner was cast to a dimension of 3" outer diameter with a 1.85" inner diameter. The liner was 9" long. The composition of the liner was 100 parts Epon 820, 8.7 parts Epon curing agent T and 20 parts p-polyphenylene. The liners were fired in a 1,000 pound thrust motor at 1,044 p.s.i. chamber pressure, utilizing as fuel a mixture of IRFNA-UDMH. IRFNA is the art accepted abbreviation for "inhibited red fuming nitric acid" and UDMH is the art accepted abbreviation for "unsymmetrical dimethyl hydrazine." These abbreviations are referenced in Rocket Propulsion Technology, edited by Carton, Maxwell, and Hurden, Plenum Press, New York, 1961, vol. 1, pages 223–224. The results of a 4.63 second firing showed an average material loss rate of .049"/second. The material behaved well as a liner and met the requirements for successful utilization in rocket motor application. In addition, this engine firing exhibited an average C* (which is a measure of engine efficiency) of 107 percent of theoretical compared to a value of about 94 percent of theoretical obtained from the same engine using conventional, inorganic-filled ablator serves to enhance engine performance.

The invention has been particularly described with regard to the use of epoxy resins which are readily available for use in castable ablative systems. However, the principle of the invention of incorporating p-polyphenylene to form a char and thus enhance ablative performance in liquid castable resins can be applied to other ablative resins. These additional resins include liquid curable forms of polymers such as silicones, polyurethanes, functional group containing polybutadienes such as carboxy-terminated polybutadiene and polysulfides.

TABLE I

| Sample No. | 1 | 2 | 3 | 4 | 5 | 6 | 7 |
|---|---|---|---|---|---|---|---|
| Component: | | | | | | | |
| Epocast 31 A (epoxy-novolak) | 100 | 100 | 100 | | | | |
| Epocast Hardener 9216-1 | 19 | 19 | 18.8 | | | | |
| Epon 820 (epoxy) | | | | 100 | 100 | 100 | |
| Epon Curing Agent T | | | | 8.7 | 8.7 | 8.2 | |
| p-Polyphenylene | | 20 | 31.2 | | 8.9 | 22.5 | 100 |

We claim:
1. A ablative composition of matter comprising:
an ablative castable resin consisting of a polyglycidyl ether of a polyhydric phenol, and
p-polyphenylene in an amount of from 5 to 50 parts per hundred parts of said resin sufficient to provide a char surface.

2. The composition of claim 1 wherein said resin is an epoxy resin derived from Bisphenol A and epichlorohydrin.

3. The composition of claim 1 wherein the resin is an epoxy-novolak resin.

4. A ablative composition of matter consisting essentially of an epoxy-novolac resin and a minor amount of a powdered intractable p-polyphenylene.

References Cited
UNITED STATES PATENTS

| | | | |
|---|---|---|---|
| 3,291,732 | 12/1966 | Spilnens | 252—28 |
| 3,291,733 | 12/1966 | McCarthy | 252—28 |

MURRAY TILLMAN, Primary Examiner

P. LIEBERMAN, Assistant Examiner

U.S. Cl. X.R.

260—2, 39, 823, 824, 858, 868